US010083050B2

United States Patent
Douek et al.

(10) Patent No.: US 10,083,050 B2
(45) Date of Patent: Sep. 25, 2018

(54) USER INTERFACE USAGE SIMULATION GENERATION AND PRESENTATION

(71) Applicant: Shift 6 Ltd., Tel-Aviv (IL)

(72) Inventors: Yehonatan Douek, Givataim (IL); Zahi Boussiba, Givataim (IL)

(73) Assignee: Shift 6 Ltd., Tel-Aviv (IL)

( * ) Notice: Subject to any disclaimer, the term of this patent is extended or adjusted under 35 U.S.C. 154(b) by 270 days.

(21) Appl. No.: 14/513,311

(22) Filed: Oct. 14, 2014

(65) Prior Publication Data

US 2016/0011755 A1   Jan. 14, 2016

Related U.S. Application Data

(60) Provisional application No. 62/023,903, filed on Jul. 13, 2014.

(51) Int. Cl.
| | |
|---|---|
| *G06F 9/451* | (2018.01) |
| *G06F 9/455* | (2018.01) |
| *G06F 11/34* | (2006.01) |
| *G06F 11/32* | (2006.01) |
| *G06F 9/44* | (2018.01) |

(52) U.S. Cl.
CPC ............ *G06F 9/451* (2018.02); *G06F 9/4443* (2013.01); *G06F 9/455* (2013.01); *G06F 11/3438* (2013.01); *G06F 11/323* (2013.01)

(58) Field of Classification Search
CPC ....... G06F 11/34; G06F 11/30; G06F 2201/00
See application file for complete search history.

(56) References Cited

U.S. PATENT DOCUMENTS

| | | | | |
|---|---|---|---|---|
| 7,941,525 B1 * | 5/2011 | Yavilevich | ............ | H04L 67/22 709/203 |
| 2005/0086255 A1 * | 4/2005 | Schran | .................. | G06F 11/34 |
| 2006/0282660 A1 * | 12/2006 | Varghese | ............ | G06Q 20/341 713/155 |

(Continued)

OTHER PUBLICATIONS

Google, Google Map JavaScript API http://web.archive.org/web/20140818121157/https://developers.google.com/maps/documentation/javascript/heatmaplayer Published on Jun. 24, 2014.*

(Continued)

*Primary Examiner* — Renee D Chavez
*Assistant Examiner* — Sean Hsiao

(57) ABSTRACT

A method of simulating end user interaction with a user interface that comprises identifying a user interaction session during which an end user interacts with an application hosted by a client terminal via a user interface which is displayed by the application on a display of the client terminal, iteratively documenting user interface states of the user interface during the user interaction session, the user interface states are tagged to indicate a runtime presentation timing, and iteratively documenting user inputs inputted by the user during the user interaction session, the user inputs are documented with reference to display areas of the user interface at a respective of the user interface states during the user interaction session. The user interface states and the user inputs are time synchronized to generate a simulation of the user inputs during the interaction session with reference to the user interface states in a sequential manner.

20 Claims, 9 Drawing Sheets

(56) References Cited

U.S. PATENT DOCUMENTS

| | | | | |
|---|---|---|---|---|
| 2006/0284838 A1* | 12/2006 | Tsatalos | ................. | G06Q 10/10 345/156 |
| 2007/0035764 A1* | 2/2007 | Aldrich | ............... | G06F 17/3028 358/1.15 |
| 2013/0110565 A1* | 5/2013 | Means, Jr. | ........... | G06Q 10/063 705/7.11 |
| 2013/0297767 A1* | 11/2013 | Kozine | ............... | G06F 11/3447 709/224 |
| 2013/0304906 A1* | 11/2013 | Yavilevich | ............... | H04L 67/22 709/224 |
| 2014/0068503 A1* | 3/2014 | Yoon | ................... | G06F 3/04842 715/790 |
| 2015/0082135 A1* | 3/2015 | Schlesinger | ........ | G06F 17/2235 715/202 |

OTHER PUBLICATIONS

Clicktale, Form Analytics http://web.archive.org/web/20140328231638/ http://www.clicktale.com/form-analytics-1 Published Mar. 28, 2014.*
Campbell, Ryan, "How to Add an API to your Web Service" [online], [retrieved on Oct. 11, 2017]. Retrieved from the Internet <URL: http://particletree.com/features/how-to-add-an-api-to-your-web-service/>.*

* cited by examiner

USER INTERFACE USAGE SIMULATION GENERATION AND PRESENTATION

RELATED APPLICATION

This application claims the benefit of priority under 35 USC 119(e) of U.S. Provisional Patent Application No. 62/023,903 filed on Jul. 13, 2014, the contents of which are incorporated herein by reference in their entirety.

BACKGROUND

The present invention, in some embodiments thereof, relates to a data presentation and, more specifically, but not exclusively, to a user interface usage simulation generation and presentation.

A heat map is a graphical representation of data where the individual values contained in a matrix are represented as colors. The term is also used to mean its thematic application as a choropleth map. The term "Heatmap" was originally coined and trademarked by software designer Cormac Kinney in 1991, to describe a 2D display depicting real time financial market information.

Heat maps are used by application analytics which refers to the analysis of data created by application sage by users. For instance, application analytics can be used to mine user interactions data, such as the way users interact with user interfaces. A variety of user interactions data is aggregated such to allow generating heat maps indicative of common locations of user inputs. There are number of application analytics tools presently available such as heatmaps(dot)io.

SUMMARY

According to an aspect of some embodiments of the present invention there is provided a method of simulating end user interaction with a user interface of an application installed in a client terminal. The method comprises identifying a user interaction session during which an end user interacts with an application hosted by a client terminal via a user interface which is displayed by the application on a display of the client terminal, iteratively documenting a plurality of user interface states of the user interface during the user interaction session, the plurality of user interface states are tagged to indicate a runtime presentation timing, iteratively documenting a plurality of user inputs inputted by the user during the user interaction session, the plurality of user inputs are documented with reference to display areas of the user interface at a respective of the plurality of user interface states during the user interaction session, and uploading the plurality of user interface states and the plurality of user inputs to a network connected central unit. The plurality of user interface states and the plurality of user inputs are time synchronized to generate a simulation of the plurality of user inputs during the interaction session with reference to the plurality of user interface states in a sequential manner.

Optionally, the simulation is an animation of the plurality of user inputs during the interaction session over the plurality of user interface states where the plurality of user interface states are presented at the same order it has been presented during the interaction session.

Optionally, the documenting a plurality of user interface states comprises recording a plurality of screenshots indicative of the plurality of user interface states; wherein the plurality of screenshots and the plurality of user inputs are time synchronized to generate the simulation.

Optionally, the iteratively documenting a plurality of user inputs comprises identifying a type of each of the plurality of user inputs; wherein the simulation is generated to reflect the type.

Optionally, the iteratively documenting a plurality of user inputs comprises filtering keyboard user inputs from the plurality of user inputs.

Optionally, the uploading is performed when an idle state of the application is detected.

Optionally, the method further comprises adding at least one call function a code of the application to allow the application to perform the iteratively documenting a plurality of user interface states and the iteratively documenting a plurality of user inputs from a main thread thereof.

Optionally, the iteratively documenting a plurality of user interface states and the iteratively documenting a plurality of user inputs is performed by a main thread of the application.

Optionally, the plurality of user interface states comprises a plurality of different windows of the user interface.

Optionally, the method further comprises identifying a malfunction of the application during the user interaction session and classifying the simulation as a malfunction generating user input sequence.

Optionally, the method further comprises:
repeating the identifying, the iteratively documenting a plurality of user inputs, the iteratively documenting a plurality of user interface states, and the uploading at a plurality of sub applications installed in a plurality of applications hosted by a plurality of client terminals to gather a plurality of simulations, and
analyzing the plurality of simulations to generate a report indicative of an application usage pattern of a plurality of end users.

More optionally, the application usage pattern is a prevalence of a user input of a certain type.

More optionally, the application usage pattern is a conversion rate per different usage patterns.

Optionally, the iteratively documenting a plurality of user interface states comprises capturing a plurality of images of the plurality of user interface states and encoding each the image in an RGBA pixel format.

Optionally, the iteratively documenting a plurality of user inputs comprises selecting the plurality of user inputs from user inputs held during the user interaction session according to an analysis of screen coordinates indicative of a tapping location on the display.

Optionally, the iteratively documenting a plurality of user inputs comprises selecting the plurality of user inputs from user inputs held during the user interaction session such that each member of the plurality of user inputs is selected from a group consisting of a button tap, a selection of items from a displayed list, a selection or a deselection of a checkbox item, and a user input leading to a transition between user interface states.

Optionally, the iteratively documenting a plurality of user inputs comprises selecting the plurality of user inputs from user inputs held during the user interaction session according to an analysis of textual content of the user inputs.

According to an aspect of some embodiments of the present invention there is a system of simulating end user interaction with a user interface of an application installed in a client terminal. The system comprises a central unit and a sub application, which is integrated into an application hosted by a client terminal to execute a code for identifying a user interaction session during which an end user interacts with the application via a user interface displayed by the application on a display of the client terminal, the sub application iteratively documents a plurality of user interface states of the user interface during the user interaction session, the plurality of user interface states are tagged to indicate a runtime presentation timing, the sub application iteratively documents a plurality of user inputs inputted by the user during the user interaction session, the plurality of user inputs are documented with reference to display areas of the user interface at a respective of the plurality of user interface states during the user interaction session, the sub application iteratively uploads the plurality of user interface states and the plurality of user inputs to the central unit. The central unit is set to synchronize the plurality of user interface states and the plurality of user inputs to generate an animated simulation of the plurality of user inputs during the interaction session with reference to the plurality of user interface states in a sequential manner.

According to an aspect of some embodiments of the present invention there is a method of generating a presentation of a distribution of plurality of user inputs made by different users with reference to a user interface. The method comprises aggregating from each of a plurality of applications installed in a plurality of client terminals a plurality of user input records, each one of the plurality of user input records is indicative of an area from a plurality of areas of a screen display of a user interface at one of a plurality of user interface states during a runtime of a respective application of the plurality of applications and grouping the plurality of user input records to generate a graphical presentation of a distribution of user interactions among at least some of the plurality of areas.

Optionally, the graphical presentation indicates the distribution be presenting a percentage indicative of a user input share on at least some of the plurality of areas.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
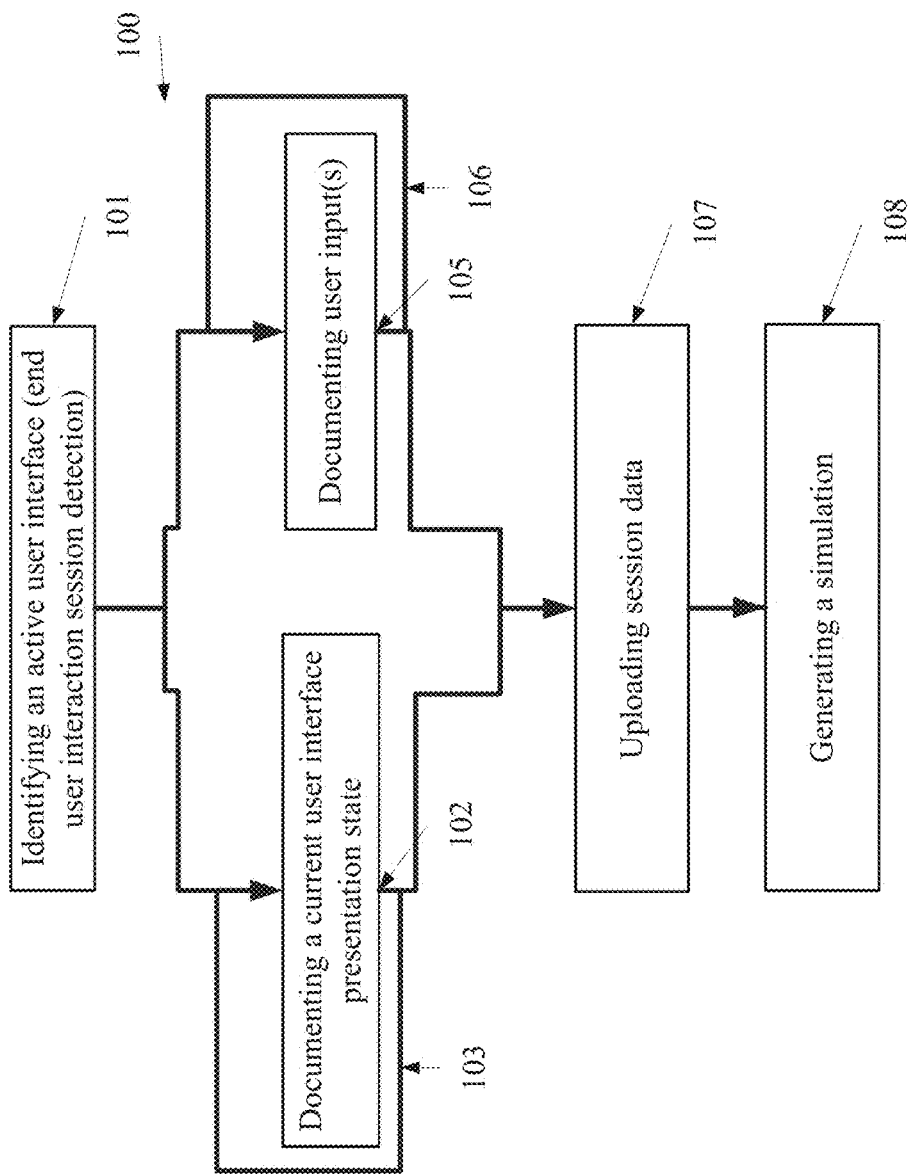
FIG. 1 is a flowchart of a method of generating a simulation of user inputs, such as touch events of a user which uses a user interface, such as a graphical user interface (GUI), of an application running on a client terminal, such as a Smartphone, according to some embodiments of the present invention.

The present invention, in some embodiments thereof, relates to an application analytics and, more specifically, but not exclusively, to a user interface usage simulation generation and presentation.

According to some embodiments of the present invention, there are provided methods and systems of generating a user single user interaction session simulation which emulates user inputs, such as touch events, made with a touch screen user interface of an application based on simulation data documented during the runtime of the application. The methods and systems are based on real time documentation of user interface states, for example screenshots, and user inputs, such as touch events, for example gestures and fingertip selections, and the synchronization of the user interface states with the user inputs based on time tags.

The methods and systems are optionally implemented by adding a sub application code to the application, facilitating the running of documentation and uploading function from the main thread of the application and not only as a background process.

The methods and systems optionally implement computational complexity reduction mechanisms which allow collecting and uploading the documented data without substantially affecting the application runtime and/or user experience. For example, the documented data may be uploaded only when the application is idle. In another example, screenshots are taken only when no user interaction is detected.

Optionally a dashboard may be used for generating reports based on documented data which is uploaded from a plurality of different client terminals.

According to some embodiments of the present invention, there are provided methods and systems of generating user input frequency maps, also referred to as heatmaps, which are indicative of a distribution of user inputs in different screen areas, for example by the presentation of user input share in different areas of user interface states, for example windows of a user interface.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or to other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a flowchart 100 of a method of generating a simulation of user inputs, such as touch events of an end user which uses a user interface, such as a graphical user interface (GUI), of an application running on a client terminal, such as a Smartphone, according to some embodiments of the present invention. The simulation may be used for identifying GUI design problems and/or application malfunctions by real time application usage monitoring of a crowd of end users. A touch event may be a touch screen input, such as a finger bounce, a multi-finger touch, a finger gesture, such as a scribble, a multi finger gesture, such as a fingertip claw opening or closing (pinch) movement, a finger tapping on or around a virtual button and/or a slider displayed on a screen of the client terminal and/or the like. A client terminal means a Smartphone, a tablet, a wearable device, and/or any computing unit which hosts a user interface based application, such as App Store™ and Google Play™ applications.

Optionally, the method is based on a thread or a sub application executed as part of an execution of a monitored application and gathers screenshot data and user inputs for generating a simulation of user inputs during the runtime of the monitored application.

Figure 2:
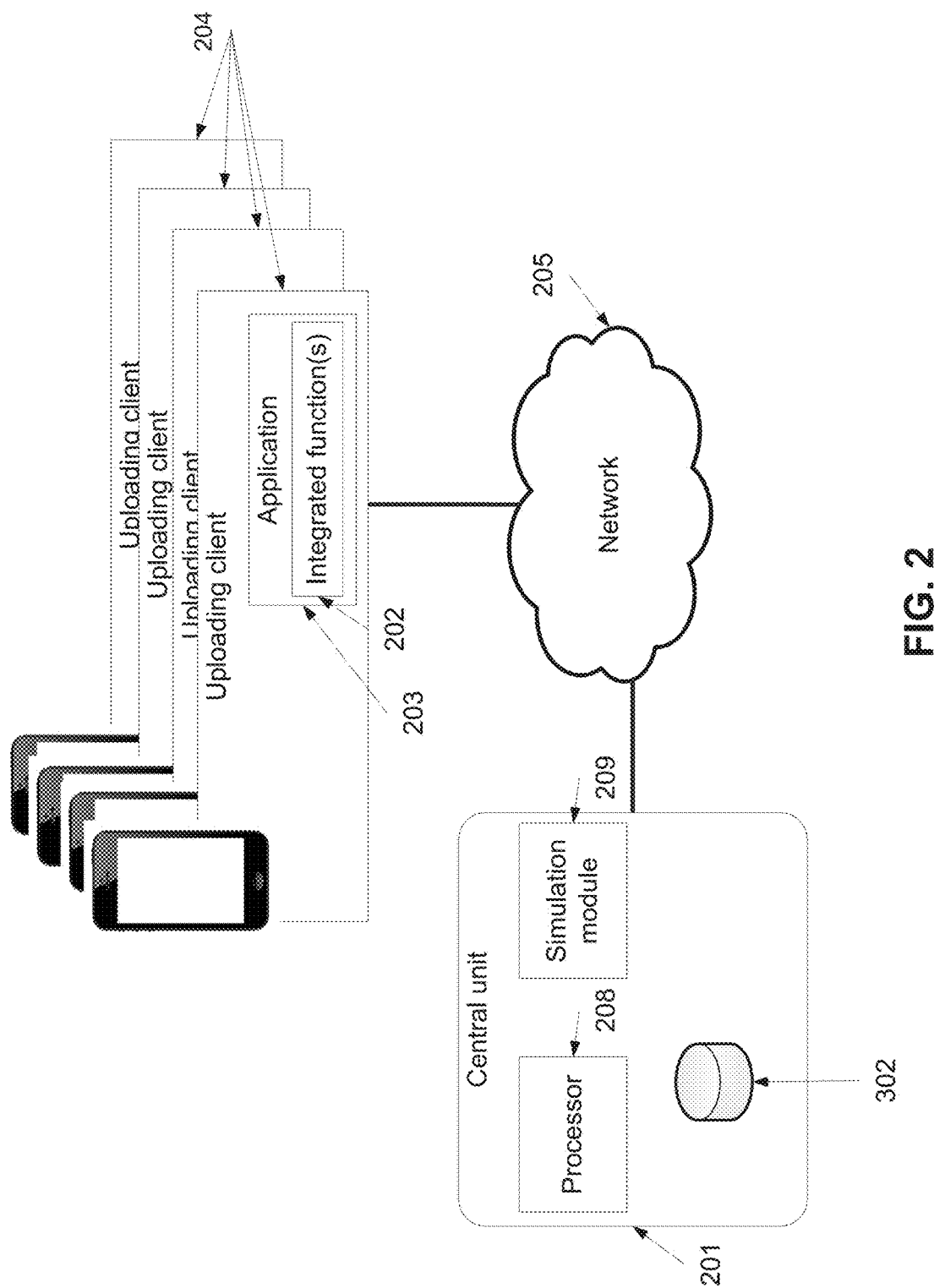
FIG. 2 is a schematic illustration of a system comprising a central unit for receiving data gathered by a sub application executed as part of an execution of a monitored application and generating a simulation of user inputs during the runtime of the monitored application, according to some embodiments of the present invention.

Reference is also made to FIG. 2, which is a schematic illustration of a system 200 comprising a central unit 201, such as hypertext transfer protocol (HTTP) Application Program Interface (API) server(s), for receiving data gathered by a sub application 202 executed as part of an execution of a monitored application 203 and generating a simulation of user inputs during the runtime of the monitored application, according to some embodiments thereof. The central unit 201 may be implemented using one or more servers, optionally running as virtual machines in a cloud support environment.

The sub application 202, which may be a set of one or more call functions, is optionally integrated using a Software Development Kit (SDK) that optionally includes an integrated development environment (IDE), such as a web dashboard, serving as a central programming interface. The IDE may include a programming window for writing source code and/or a visual editor which allows developers to add a respective code to the source code of the application.

The IDE allows the administrator to integrate the sub application, for instance a client-side SDK component, into the application. The sub application 202 is set to be executed on the main thread of the application for collecting application usage data of end-user(s) who use the application 203 and to communicate this data to the central unit 201 who uses one or more processors 208 for generating a GUI usage simulation, for instance using a simulation module 209. The central unit 201 processes the raw collected data and performs aggregations to generate reports, which are accessible through the IDE.

A sub application may be integrated as a call function with a single line of code. In such embodiments, when the application launches, the sub application collects data on the user inputs and optionally time synchronized device hardware data, time synchronized application metadata (such as version), time synchronized end user location, time synchronized session duration. The sub application further gathers time synchronized data about user interface presentation states, for example screenshots of a current presentation of the user interface of the application and/or an interface page or display identifier, for instance a number indicative of a hierarchical GUI state. The collected data is stored on the client terminal 204 and then uploaded to the server, for instance when the application is closed and/or when the user interface thereof is minimized or otherwise concealed or changed to an idle mode. A user interface presentation state may be a screen, a popup, a menu, a hierarchal menu state, and/or any other reproducible visual form of the user interface of the application.

Figure 3:
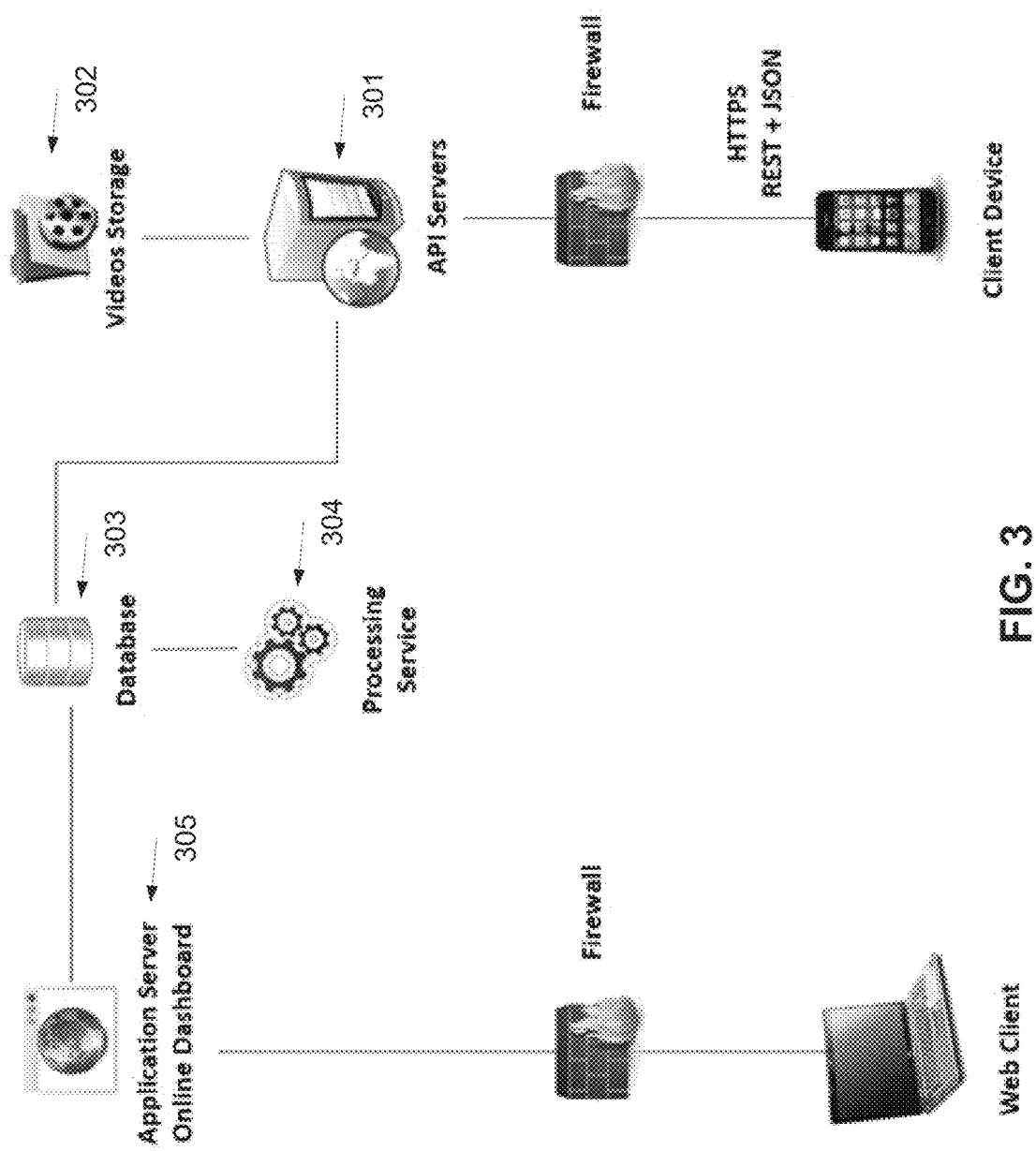
FIG. 3 is a schematic illustration of exemplary architecture data links connecting between components of the central unit, according to some embodiments of the present invention.

FIG. 3 depicts an exemplary architecture data links connecting between component of the central unit 201, for API servers 301 for enabling the sub applications 203 to perform the session data documentation, for instance as described below, a storage 302 for storing screenshots, for instance in a video format, a database 303, a processing services 304 to execute the simulation module 209, and an application server for running the IDE 305, for instance the described herein dashboard.

The central unit 201 optionally includes a simulation generation module 205 which synchronizes between the time synchronized recorded user inputs and time synchronized data about user interface presentation states, for example screenshots, to create a user interface usage simulation, for example in the form of a sequence of frames emulating a video recording of the user interface usage simulation using the runtime of the application.

The simulation enables developers to see how end user(s) interact with the user interface of the application, at the exact flow of interactions, for instance via the web dashboard, providing them tools for identifying user experience problems.

The process depicted in FIG. 1 is optionally executed by the sub application 202 during the execution of the monitored application 203. The sub application is set to be operated during the runtime of the sub application 202, while a user interface of the application is presented. As shown at 101, the presentation of the user interface is identified.

As shown at 102, a currently presented user interface presentation state, for example a screenshot of the user interface, for example the GUI, is captured during the presentation runtime and documented, for instance stored in a memory allocated to the application. As shown at 103, this capturing is optionally iteratively repeated during an end user interaction session, a session during which the end user interacts with the application 203.

Optionally, each interface presentation state is time tagged. Optionally, the sub application 202 runs an image grabber function to capture iteratively screenshots of the user interface in a timed manner, for example 1-5 times per second or any intermediate or shorter period. The sub application is optionally performed in the main thread of the application or in the background.

Additionally or alternatively, user interface presentation states are captured when a user interaction or an application event which matches a predefined setting is identified. For example, the sub application instructs the capturing of presentation states when the application presents a new hierarchical menu step or a new interactive object, such as a slider, a button, a touch area and/or the like.

Additionally or alternatively, user interface presentation states are captured when a human-computer interaction which deviates from a predefined pattern or model is detected. For example, the sub application measures the time each user input, such as touch events, for instance a fingertip screen area selection, a slide, and/or a fingertip claw movement, for instance a pinch movement. When the measured time exceeds or goes below a predefined period or a time range, human-computer interaction deviation is detected. In another example, the sub application 202 measures the area in which user inputs are made in relation to interactive object locations, for instance a distance between a fingertip touch screen area and to the location of interactive object(s), such as slider(s), and/or fingertip pinch movements. When the measured time exceeds or goes below a predefined period or a time range, human-computer interaction deviation is detected. In another example, the sub application measures the time an end user spends in a certain user interface stage. When the measured time exceeds or goes below a predefined period or a time range, human-computer interaction deviation is detected.

Optionally, the plurality of user interface presentation states, for example screenshots of the user interface are documented in a session log.

Optionally, screenshots are not taken when user inputs are detected and/or during a period after user inputs are detected.

Optionally, the session log or each screenshot therein is encoded to video format, for example while the application is running. The encoding may be done in a background process, for instance when the end user is idle in order to preserve the end user experience.

For example, a screenshot is optionally encoded as a new graphics context, sized either half or less of the original screen size.

Optionally, low or none interpolation is used.

Optionally, renderinContext( ) is used for every screenshot (i.e. window), while CGTranslateCTM object is used to adjust the screenshot, generating a bitmap and time-since-uptime which is stored in a processing queue.

Optionally, each screenshot is converted to a pixel buffer, with no aliasing and with relatively low interpolation.

Optionally, the orientation of the device is identified by the sub application, for example by querying accelerator to the operating system of the client device. In case the display is not aligned with previously captured screenshot, for instance portrait (vertical) and not landscape (horizontal), affinity matrices may be used to flip the captured screenshot.

Optionally, the screenshot is resized using scaling matrices to the size of other screenshots where needed. The screenshot, optionally flipped and/or resized, is drawn to a pixel buffer using a copy blend mode. Optionally, the pixel buffer is appended to the session log and tie tagged based on the screenshot presentation time minus processing time.

In some implementations, a timer is added to UIThread object that takes screenshots at specific intervals, for example set as described above, with low priority. In such implementations, on every tick, a screenshot is ignored when a user input, such as a touch event is detected, for instance when the touch screen is active and induces events. Start a background thread that continuously polls the processing queue, in a low priority.

In some implementations, when H.264 AVC is used with MP4 container, the video recordings take, on average, about 150 kilobyte (KB) per 1 minute of usage in an iPhone app and about 300 KB per minute for iPad apps.

As shown at 105 a plurality of user inputs made during the presentation runtime are identified and documented, for instance stored in a memory allocated to the application. For example, a user input may be identified as a gesture type (i.e. touch or a slide) and screen coordinates.

Optionally, each interface presentation state is time tagged. As shown at 106, this user input documentation is iteratively held as long as the end user interaction session.

Optionally, coordinates of each user input are saved in a coordinate system representing orientation in the display, for example in relation to an aligned portrait display.

Optionally, user inputs which are used as keyboard inputs are ignored, for example touch events on a keyboard presented on the touch screen display of the client terminal.

Exemplary user inputs which may be detected are Button taps, Selection of items from lists, Selection and/or de selection of a checkbox, a text content input, and transitions between user interface states.

As shown at 107, the user interface presentation states, for instance the screen shots, for example the session log, and/or the plurality of user inputs are uploaded to the central unit 201, optionally when an idle state of the application is detected. For example, uploading may be performed once the user interface of the application is minimized to the background.

The encoding may be performed using an AVAssetWriter object, with 32ARGB values set as the pixel format sized either half or less of the screen size.

Optionally, a pixel buffer pool is pre allocated using 32ARGB format.

Reference is now made to an exemplary implementation of the process depicted in FIG. 1 when Open Graphics Library (OpenGL) is used, for example in an application installed in an iPhone™ having an iOS™ 5 or less. In this implementation a GL screenshot at RGBA pixel format is captured every timer tick using glReadPixels. The pixels of the GL screenshot are converted to a CGImage with a 32-big order in an alpha-premultiplied-last format. The CGImage is added to a pixels buffer as described above. A texture cache is created by the sub application using CGOpenGLESTextureCacheCreate, with an underlying 32BGRA pixel buffer and a render texture is created by the sub application from the texture buffer, with a BGRA pixel format. An FBO object is also created and bound to the render texture. On every tick, a "waiting-for-GL-frame" flag is raised such that when the flag is set to true, the FBO is set as the frame buffer before a call to display the render buffer is called.

Now, as shown at 108, a simulation is generated by synchronizing between the user interface presentation states and the plurality of user inputs, for instance based on time tags. For brevity, the time tagged user interface presentation states and the time tagged plurality of user inputs may be referred to herein as simulation data.

Optionally, the user interface presentation states are unique IDs of user interfaces which allows a simulating module, for example on the server 202 to select screenshots which are identical to the on screen displays on the client terminal at the time the user interface presentation states where documented.

The simulation is optionally presented to an operator, for example on a web dashboard. An emulation of the plurality of user inputs the touch data is an overlay on top of screenshots that simulate the actions performed by the end user when the user interface of the application is presented thereto.

After the application draws to the frame buffer, data to the texture cache is to flushed and the pixel data is read therefrom. The pixel data is converted to an image using a 32-little byte order. An old frame-buffer is bound to the next frame. When the application contains UIKit elements, possible user interface states (i.e. windows) which do not contain the EGL API (i.e. EAGL) layer are reviewed, and all the sibling views of EAGL view, and their child views. Now renderInContext is called for each user interface state to locate the view on the screenshot using a translation matrix.

When needed, the view is rotated using a rotation matrix, when the "b" component of the display matrix of the view is different than 0, or when "a" component is different than 1.

Figure 4B:
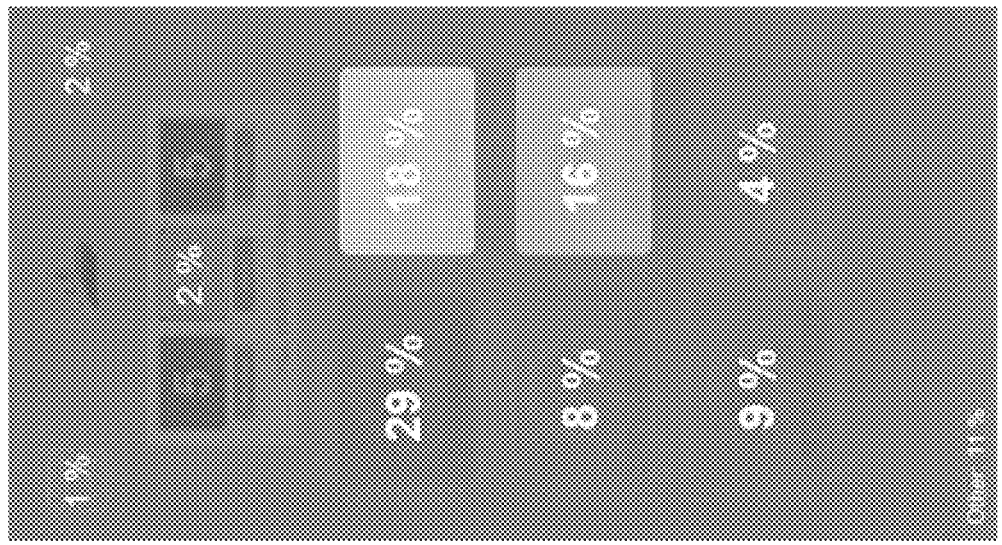
FIGS. 4A and 4B are screenshots of user input frequency maps, according to some embodiments of the present invention.
Figure 4A:
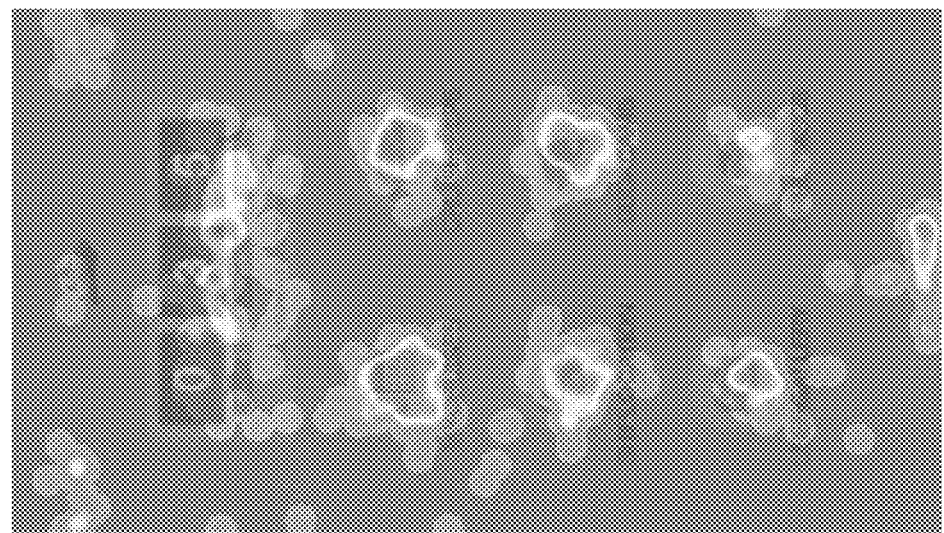

Reference is now made to FIGS. 4A and 4B which are screenshots of graphical representations, user input frequency maps, also referred to as heatmaps, mapping the distribution of user inputs on a display of an exemplary user interface state, such as touch events held with reference to a certain window of a user interface, generated according to some embodiments of the present invention. The user input frequency maps are optionally calculated by the central unit 201. The user input frequency map is optionally generated by the central unit 201 that aggregates a plurality of simulation data records from a plurality of different copies of the application which are installed in a plurality of different client terminals or simulations generated from the simulation data records. While FIG. 4A maps the distribution of user inputs using a color index (e.g. based on values between 0 and 255), FIG. 4B presents a percentage map that depicts which percentage of user inputs is performed on each and every UI element in the screen.

Optionally, user inputs which are added to the user input frequency maps are filtered based on the response of the application thereto. This allows generating a user input frequency map of unresponsive user inputs, for example touch events, such as scribbles (i.e. fingertip gestures). An unresponsive user input is an end user performed action identified by the sub application and to which the application did not respond. For instance, an unresponsive graphical object (i.e. an image) tapped or pinched by the end users, for enlargement or zoom-in, may be identified using such a user input frequency map.

Optionally, different user inputs are mapped differently such that the user input frequency map is indicative of the type and location of each user input of a certain type. The type may be, for example, a single touch, a gesture, a closing claw action (a pinch action), an opening claw action and/or the like. The location may be an on screen location.

Optionally, the states of a user interface of an application are identified and a user input frequency map is generated per state based on user inputs of different end users.

In some implementations, a user input frequency map is optionally set to depict the distribution of user inputs which are filtered based on one or more of the following user input characteristics: a screen resolution at the time the user input is made, a used OS Version (i.e. iOS™ 5 or KITKAT 1.0) installed on the device on which the application is installed, the device orientation (portrait/landscape) at the time the user input is made, a user input type (e.g. as described above), an ordinality of the user input (i.e. first interaction, second interaction, last interaction, and/or the like), and responsive of the user input to application induced events.

Additionally or alternatively, simulation data is aggregated from a plurality of sub applications which are installed in a plurality of clients iteratively. The aggregation may be set to produce hourly, weekly, and/or monthly reports (e.g. heat maps).

Optionally, user inputs are linearly normalized to value between 0-255, where 255 is the coordinate with the maximal intensity. Touch events are drawn on an image while a gradient effect is used to make every point larger.

Optionally, as shown at FIG. 4B, user inputs having coordinates proximal to a certain area are aggregated and represented by a common shaped object (e.g. a rectangular) which is presented at least on top of the certain area.

As described above, user inputs may be filtered or clustered based on screen resolution, for example the dots per inch (DPI) of the Screen, for instance to create different heat maps to each or some of the following groups: LDPI=120 DPI, MDPI=160 DPI, HDPI=240 DPI, XHDPI=320 DPI, XXHDPI=480 DPI, and XXXHDPI=640 DPI.

As described above, different user interface states may be detected by the sub application during the monitoring of the user inputs to facilitate the generation of the simulation data. In one example, the user interface states are identified by starting a timer on the UIThread and on each of a plurality of iterations of the timer going over all available user interface states (e.g. windows) to identify the top view controller: start with the window's root view controller. When not found, the entire responder chain is reviewed for a view controller. The found top view controller is recursively analyzed to find the lowest view controller. Once the lowest view controller is found, the visible inner view controller that is either visible in a navigation controller or presented or selected in a tab controller is identified. When child view controllers are found, the child view controller that is visible and has the maximal intersection with the parent view controller is found. The found child view controller is considered the top view controller.

Optionally, popups are detected by overriding OS functions (i.e. UIAlertView.show) and checking whether the top root controller is a UIAlertView, or when show is called in between timer based iterations.

Optionally, menus are detected when the top root view controller contains a UIActionSheet by recursively going over all the inner controls thereof. When the top screen found, it is compared with the last iteration such that when they are different a new screen is detected.

As described above, according to some embodiments unresponsive user inputs are detected. Reference is now made to an exemplary implantation thereof.

First, a creation of a new user interface state, for example a window, is detected using the notification center of the operating system. In response to the detection, one or more user input recognizers are installed on the window level.

Unresponsive touch events, also referred to as taps, may be detected by using swizzling to swizzle touchesBegan:withEvent. When the touchesBegan event is detected on a UIApplication, a flag that an unresponsive tap was found is raised.

When the tap recognizer, installed in a user interface state of the application, for example in a window, this flag is checked. If not—the gesture is considered unresponsive.

Other unresponsive user inputs, for example gestures identified by other gesture recognizers, for instance patterns or instructions indicative of defined gestures or modules set to identify such gestures. The touch gesture recognizers may be stored in attachment to a record in a list. When a gesture input is identified, the similarity thereof to any of the gesture recognizers is verified. When no similarity is identified, the gesture is considered unresponsive.

According to some embodiments of the present invention, the simulation data is used to detect an interaction pattern which leads to an application crash. In such embodiment, when an application crash is detected, the documented simulation data, for example recorded as described above, is associated therewith to generate a crash report. Such simulation data can now be used to simulate the exact user flow and series of steps that caused the application crash.

According to some embodiments of the present invention, the IDE of the system, for example the web dashboard, enables the customer access to one or more reports that support the understanding of the behavior of end users. The reports may include application usage information calculated based on the analysis of simulation data from various sub applications. The application usage information may include one or more of the following:

total active end users;

total new end users in a defined period;

total application launching events;

total number of recorded sessions;

average active session period (length); and total number of daily app launches and/or active end users and/or new end users.

Figure 5:
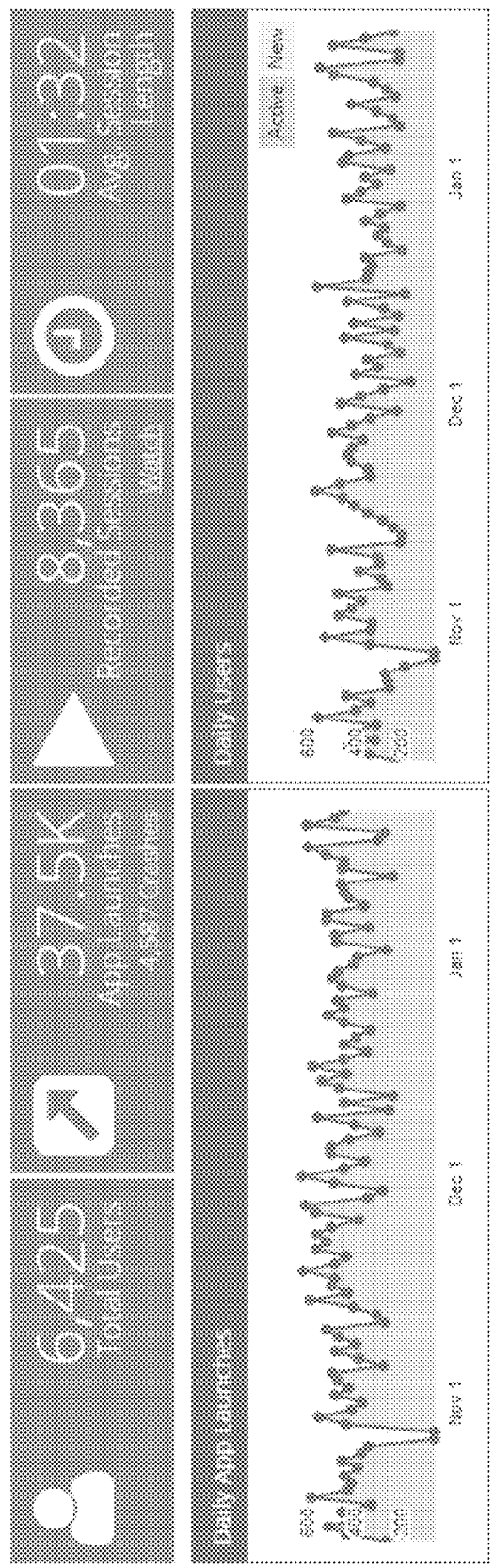
FIG. 5 is a screenshot of a report that includes all of the above application usage information options, according to some embodiments of the present invention.

For example, FIG. 5 depicts a report that includes all of the above application usage information options.

Figure 6A:
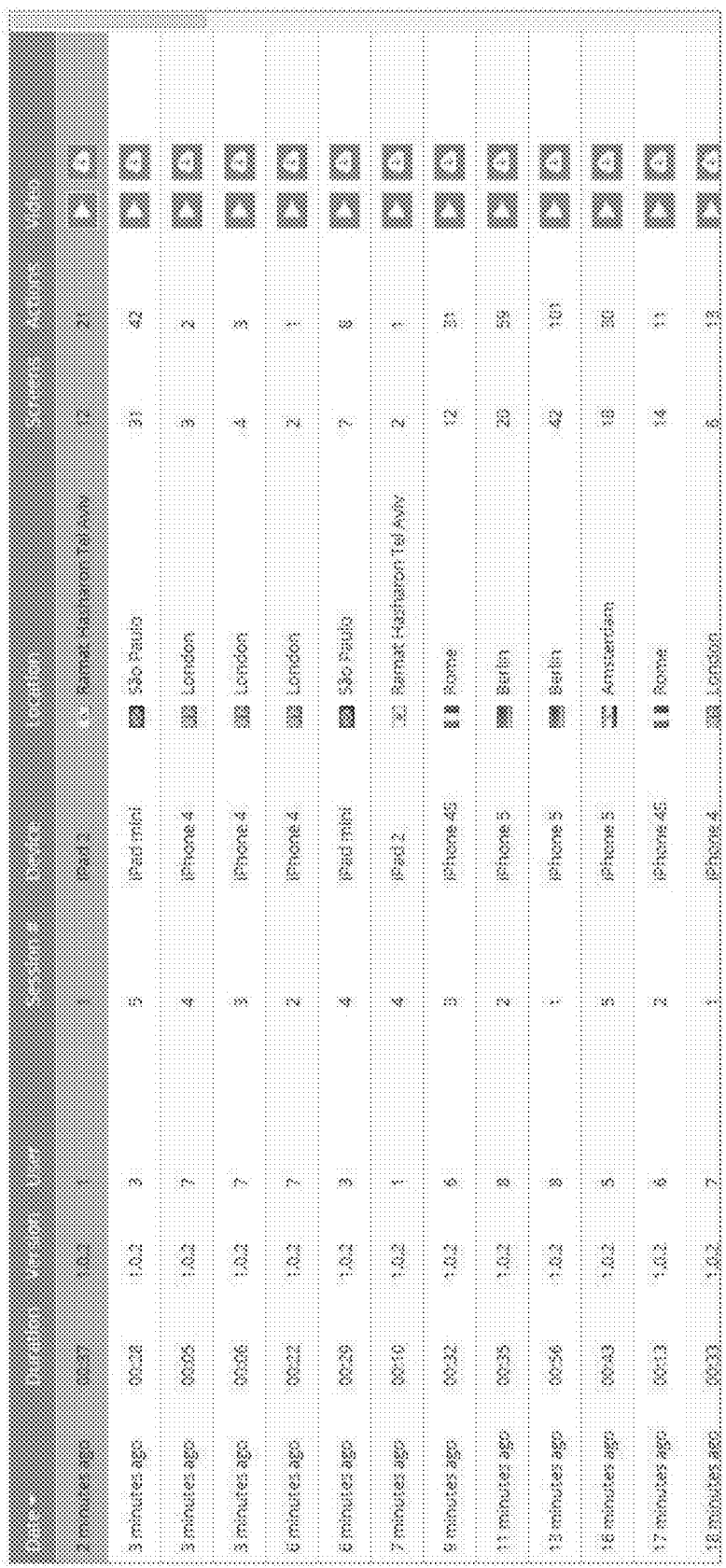
FIG. 6A is a screenshot of a list of possible per session reports, according to some embodiments of the present invention.
Figure 6B:
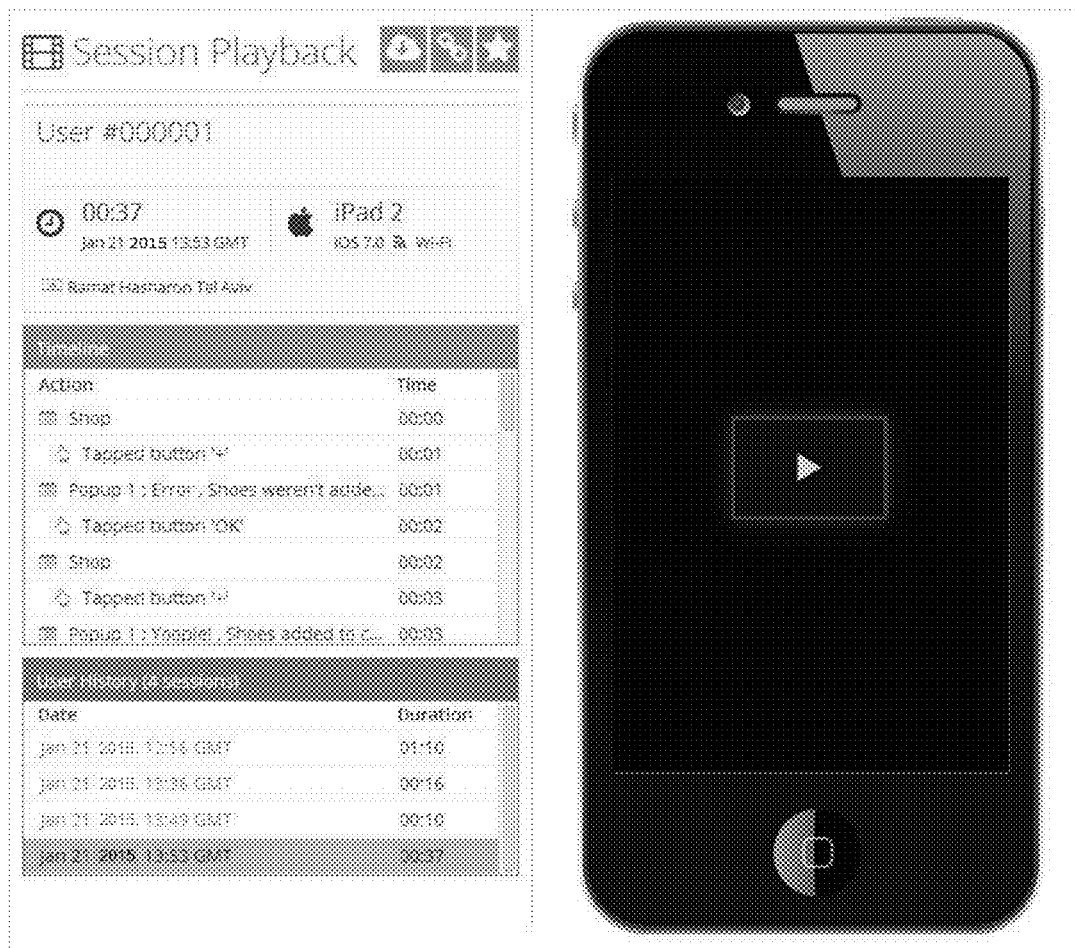
FIG. 6B is a screenshot of a GUI enabling a customer to watch a single user simulation, according to some embodiments of the present invention.

Optionally, a sessions report may be provided to each session held by an end user of the application. For example, FIG. 6A depicts a screenshot of a list of possible per session reports and FIG. 6B depicts a screenshot of a GUI enabling a customer to watch a single user simulation.

Figure 7:
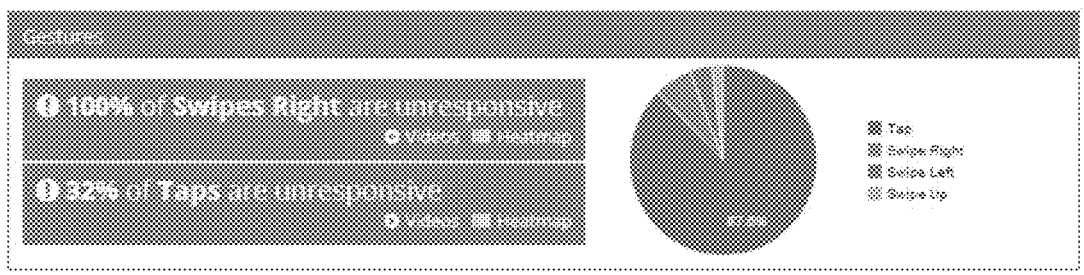
FIG. 7 is a screenshot of a gesture analysis report which displays the distribution of different touch gestures performed by end users of the application, according to some embodiments of the present invention.

Optionally, an aggregated report may be generated per input type. For example, FIG. 7 is a screenshot of a gesture analysis report which displays the distribution of different touch gestures performed by end users of the application.

Figure 8:
FIG. 8 is a screenshot of report that presents all popups that were presented in the app, how many end users were exposed to each popup, and the different selections made by the end users, according to some embodiments of the present invention.

Optionally, an aggregated report may be generated per user interface state. For example, FIG. 8 is a screenshot of report that presents all popups that were presented in the app, how many end users were exposed to each popup, and the different selections made by the end users.

Figure 9:
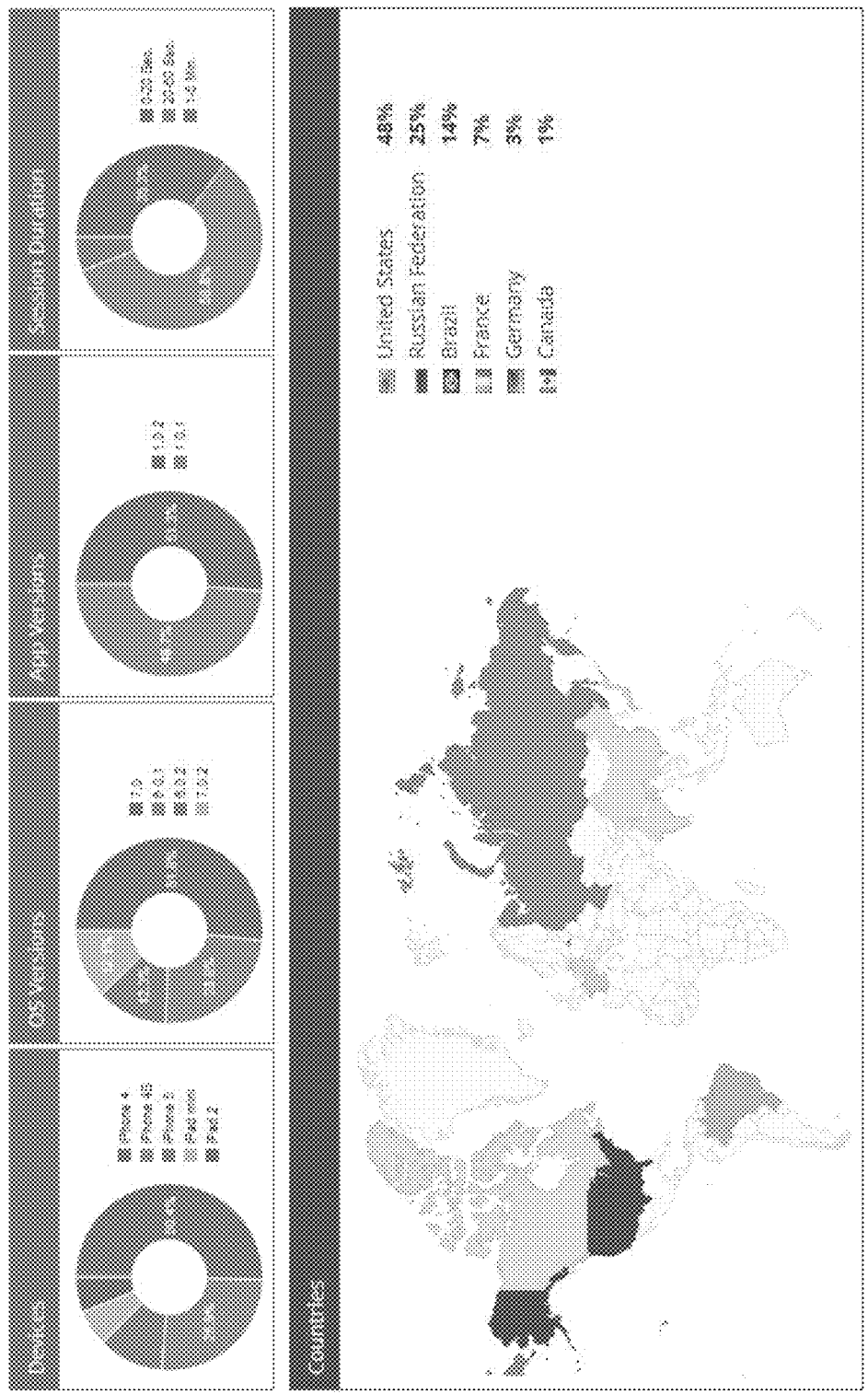
FIG. 9 is a screenshot of an exemplary report generated to show statistical data, according to some embodiments of the present invention.

Optionally, an aggregated report may be generated to show statistical data regarding the application usage among end users, for example which devices are used, which operating systems are used, session durations, which application versions are used, and/or the end users location. FIG. 9 depicts an exemplary report generated to show statistical data regarding the application usage among end users in different countries and/or based on other group distribution, for example used OS version, used application version, used device, and/or used session duration.

Optionally, an aggregated report may be generated to present conversion funnels which enable customers to measure the conversion rates between each user interface state (screen or event) of relevant processes within the app.

The methods as described above are used in the fabrication of integrated circuit chips.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a module, a processor, a system, and a unit is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of simulating end user interaction with a user interface of an application installed in a client terminal comprising:
    providing a sub application, to be executed by a processor of a client terminal, for:
    identifying a user interaction session during which an end user interacts with an application hosted by a client terminal via a user interface which is displayed by said application on a display of said client terminal;
    iteratively identifying when a change in a plurality of user interface presentation states occurs, by detecting when said application presents a new visual form of said user interface;
    upon each of said iterative identification, capturing respective said user interface presentation states following said change;
    tagging each of said plurality of user interface presentation states with a runtime presentation timing of a time of said capturing;
    documenting each of said captured and tagged plurality of user interface presentation states;
    iteratively documenting a plurality of user inputs inputted by said user during said user interaction session, said plurality of user inputs are documented with reference to display areas of said user interface at a respective of said plurality of user interface presentation states during said user interaction session, wherein said plurality of user inputs are tagged with a runtime timing indication, wherein said plurality of user inputs including at least one of a single touch, a gesture, a closing claw action and an opening claw action;
    wherein each of said plurality of user interface presentation states comprising a unique ID;
    uploading said change of said plurality of user interface presentation states, said unique ID, and said plurality of user inputs to a network connected central unit;
    at said central unit:
    synchronizing between said change of said plurality of user interface presentation states and said plurality of user inputs by determining a sequential order of said plurality of user interface presentation states and said plurality of user inputs according to said runtime presentation timing and said runtime timing indication; and
    generating a user frequency map for each usage simulation using said synchronized change of said plurality of user interface presentation states and said plurality of user inputs by forming a sequence of frames emulating a video recording;
    wherein said forming said sequence of frames is by using a plurality of pre-captured screenshots each representing a respective one of said plurality of user interface presentation states according to a match with said unique ID.

2. The method of claim 1, wherein said simulation is an animation of said plurality of user inputs during said interaction session over said plurality of user interface presentation states where said plurality of user interface presentation states are presented at the same order it has been presented during said interaction session.

3. The method of claim 1, wherein said documenting a plurality of user interface presentation states comprises recording a plurality of screenshots indicative of said plurality of user interface states; wherein said plurality of screenshots and said plurality of user inputs are time synchronized to generate said simulation.

4. The method of claim 1, wherein said iteratively documenting a plurality of user inputs comprises identifying a type of each of said plurality of user inputs; wherein said simulation is generated to reflect said type.

5. The method of claim 1, wherein said iteratively documenting a plurality of user inputs comprises filtering keyboard user inputs from said plurality of user inputs.

6. The method of claim 1, wherein said uploading is performed when an idle state of said application is detected.

7. The method of claim 1, wherein said sub application is at least one call function added to a code of said application to allow said application to perform from a main thread of said application, said iteratively identifying, said capturing, said tagging, said documenting a plurality of user interface presentation states and said iteratively documenting a plurality of user inputs.

8. The method of claim 1, wherein said iteratively identifying, said capturing, said tagging, said documenting a plurality of user interface presentation states and said iteratively documenting a plurality of user inputs is performed by a main thread of said application.

9. The method of claim 1, wherein said plurality of user interface presentation states comprises a plurality of different windows of said user interface.

10. The method of claim 1, further comprising identifying a malfunction of said application during said user interaction session and classifying said simulation as a malfunction generating user input sequence.

11. The method of claim 1, further comprising:
    repeating said iteratively identifying, said capturing, said tagging, said documenting a plurality of user inputs, said iteratively documenting a plurality of user interface presentation states, and said uploading, at a plurality of sub applications installed in a plurality of applications hosted by a plurality of client terminals to gather a plurality of simulations, and
    analyzing said plurality of simulations to generate a report indicative of an application usage pattern of a plurality of end users.

12. The method of claim 11, wherein said application usage pattern is a prevalence of a user input of a certain type.

13. The method of claim 11, wherein said application usage pattern is a conversion rate per different usage patterns.

14. A computer program product comprising:
    a non-transitory computer readable storage medium;
    first program instructions to provide a sub application, to be executed by a processor of a client terminal, for:
    identifying a user interaction session during which an end user interacts with an application hosted by a client terminal via a user interface which is displayed by said application on a display of said client terminal;
    iteratively identifying when a change in a plurality of user interface presentation states occurs, by detecting when said application presents a new visual form of said user interface;

capturing, upon each of said iterative identification, respective said user interface presentation states following said change;

tagging each of said plurality of user interface presentation states with a runtime presentation timing of a time of said capturing;

documenting each of said captured and tagged plurality of user interface presentation states;

iteratively documenting a plurality of user inputs inputted by said user during said user interaction session, said plurality of user inputs are documented with reference to display areas of said user interface at a respective of said plurality of user interface presentation states during said user interaction session, wherein said plurality of user inputs are tagged with a runtime timing indication, wherein said plurality of user inputs including at least one of a single touch, a gesture, a closing claw action and an opening claw action;

wherein each of said plurality of user interface presentation states comprising a unique ID, uploading said change of said plurality of user interface presentation states, said unique ID, and said plurality of user inputs to a network connected central unit;

second program instructions to synchronize between said change of said plurality of user interface presentation states and said plurality of user inputs by determining a sequential order of said plurality of user interface presentation states and said plurality of user inputs according to said runtime presentation timing and said runtime timing indication; and third program instructions to generate a user frequency map for each usage simulation using said synchronized change of said plurality of user interface presentation states and said plurality of user inputs by forming a sequence of frames emulating a video recording;

wherein said first, second and third program instructions are stored on said non-transitory computer readable storage medium;

wherein said forming said sequence of frames is by using a plurality of pre-captured screenshots each representing a respective one of said plurality of user interface presentation states according to a match with said unique ID.

15. The method of claim 1, wherein said capturing said respective said user interface presentation states comprises capturing a plurality of images of said plurality of user interface presentation states and encoding each said image in an RGBA pixel format.

16. The method of claim 1, wherein said iteratively documenting a plurality of user inputs comprises selecting said plurality of user inputs from user inputs held during said user interaction session according to an analysis of screen coordinates indicative of a tapping location on said display.

17. The method of claim 1, wherein said iteratively documenting a plurality of user inputs comprises selecting said plurality of user inputs from user inputs held during said user interaction session such that each member of said plurality of user inputs is selected from a group consisting of a button tap, a selection of items from a displayed list, a selection or a deselection of a checkbox item, and a user input leading to a transition between user interface presentation states.

18. The method of claim 1, wherein said iteratively documenting a plurality of user inputs comprises selecting said plurality of user inputs from user inputs held during said user interaction session according to an analysis of textual content of said user inputs.

19. A system of simulating end user interaction with a user interface of an application installed in a client terminal comprising:

a central unit;

a sub application, which is integrated into an application hosted by a client terminal to execute a code for identifying a user interaction session during which an end user interacts with said application via a user interface displayed by said application on a display of said client terminal, said sub application iteratively identifies when a change in a plurality of user interface presentation states occurs, by detecting when said application presents a new visual form of said user interface, upon each of said iterative identification, captures respective said user interface presentation states following said change, tags each of said plurality of user interface presentation states with a runtime presentation timing of a time of said capturing and documents each of said captured and tagged plurality of user interface presentation states, said sub application iteratively documents a plurality of user inputs inputted by said user during said user interaction session, said plurality of user inputs are documented with reference to display areas of said user interface at a respective of said plurality of user interface presentation states during said user interaction session wherein said plurality of user inputs are tagged with a runtime timing indication, wherein said plurality of user inputs including at least one of a single touch, a gesture, a closing claw action and an opening claw action: wherein each of said plurality of user interface presentation states comprising a unique ID, said sub application iteratively uploads said change of said plurality of user interface presentation states and said plurality of user inputs to said central unit;

wherein said central unit synchronizes between said uploaded change of said plurality of user interface presentation states, said unique ID, and said uploaded plurality of user inputs by determining a sequential order of said plurality of user interface presentation states and said plurality of user inputs according to said runtime presentation timing and said runtime timing indication, and generates a user frequency map for each said synchronized change using said uploaded documented data of said plurality of user interface presentation states and said plurality of user inputs in a sequential manner, emulating a video recording;

wherein said forming said sequence of frames is by using a plurality of pre-captured screenshots each representing a respective one of said plurality of user interface presentation states according to a match with said unique ID.

20. The method of claim 1, wherein said capturing of said plurality of user interface presentation states is conducted when a human-computer interaction of said end user deviates from a predefined interaction pattern.

* * * * *